(12) United States Patent
Houh et al.

(10) Patent No.: US 7,877,736 B2
(45) Date of Patent: Jan. 25, 2011

(54) COMPUTER LANGUAGE INTERPRETATION AND OPTIMIZATION FOR SERVER TESTING

(75) Inventors: Henry Houh, Lexington, MA (US); Jeff Stern, Medford, MA (US)

(73) Assignee: Oracle International Corp., Redwood Shores, CA (US)

( * ) Notice: Subject to any disclaimer, the term of this patent is extended or adjusted under 35 U.S.C. 154(b) by 1308 days.

(21) Appl. No.: 10/968,246

(22) Filed: Oct. 19, 2004

(65) Prior Publication Data
US 2005/0138104 A1 Jun. 23, 2005

Related U.S. Application Data

(60) Provisional application No. 60/512,837, filed on Oct. 20, 2003.

(51) Int. Cl.
*G06F 9/44* (2006.01)
(52) U.S. Cl. .................... 717/131; 717/124
(58) Field of Classification Search ............ None
See application file for complete search history.

(56) References Cited

U.S. PATENT DOCUMENTS

| | | | | |
|---|---|---|---|---|
| 5,974,572 A | * | 10/1999 | Weinberg et al. | 714/47 |
| 6,360,332 B1 | * | 3/2002 | Weinberg et al. | 714/4 |
| 6,449,739 B1 | * | 9/2002 | Landan | 714/47 |
| 6,477,843 B2 | * | 11/2002 | Schroeder et al. | 60/772 |
| 6,549,944 B1 | * | 4/2003 | Weinberg et al. | 709/224 |
| 6,587,969 B1 | * | 7/2003 | Weinberg et al. | 714/46 |
| 6,799,213 B1 | * | 9/2004 | Zhao et al. | 709/224 |

\* cited by examiner

*Primary Examiner*—Tuan Q Dam
*Assistant Examiner*—Evral Bodden (57) ABSTRACT

A method, software application and computer system provides computer language interpretations and optimization for web server testing by first recording user actions associated with an instance of a user interaction with a web server. The actions are analyzed to determine a collection of actions which alter communications with the server or have side effects which alter a future communication with the server. A test program is generated from the collection of actions. The test program is used to perform one or more of functional, load, and monitoring testing of a web server.

18 Claims, 5 Drawing Sheets

COMPUTER LANGUAGE INTERPRETATION AND OPTIMIZATION FOR SERVER TESTING

CROSS REFERENCE TO RELATED APPLICATIONS

The present application claims the benefit of U.S. Provisional Patent Application No. 60/512,837, filed on Oct. 20, 2003, which is incorporated herein by reference.

BACKGROUND

Computers have been utilized as devices for testing web servers and software applications running on the web servers. Computers used to test the web-based software applications are referred to herein as virtual web user systems, since they can duplicate actions of one or more web users who are interacting with the software application.

Virtual web user systems have been provided that are programmed in a variety of ways. For example, an E-test™ virtual web user system from EMPIRIX®, Inc. of Bedford, Mass., can be programmed in Visual Basic. The Visual Basic program can include test scripts that cause the virtual web user system to perform a sequence of tests of the web server. For example, the test scripts can be associated with simulated web user queries to the web server, such as simulated mouse clicks or simulated data entry, for example a name and an address, made by a web user.

Web servers can be tested in a variety of test contexts, and the virtual web user system has been applied to the variety of test contexts. One test context is referred to as functional testing which is defined as the testing generally performed before the web server is released to the public in order to verify that the web server hardware and/or software is functioning properly.

Another test context is known as load testing which is generally defined as the testing generally performed while the web server hardware and software is in public use to verify that the web server hardware and/or software can accommodate at least a certain number of simultaneous web users. Alternatively, the load testing can be performed while the web server is not in public use. In load testing, it is desirable to provide a large number of virtual web users to test the delay time latencies that can be caused by many simultaneous web users.

Yet another test context is known as monitoring testing which is understood to be testing that is generally performed while the web server is in public use to verify that the web server hardware and/or software is operational. The monitoring testing may be performed in an automatic background mode wherein the monitoring testing is run at predetermined time intervals to ensure the web server is running properly, Each of the functional testing, the load testing, and the monitoring testing, has different requirements. For example, a designer of the web server system using a functional test may want to test each possible path through the variety of branching web access options presented to a web user on a web page. In functional testing it may only be necessary to provide a single virtual web user, which exercises, in sequence, most or all of the possible paths through the web page. For another example, a test manager using a load test may want to test only some of the variety of paths through the web page. For yet another example, a test manager using a monitoring test may want to minimally test the general operation of the software application from time to time. In monitoring testing it may only be necessary to provide a single virtual web user, and exercise one or a small number of paths through the web page.

SUMMARY

Conventional mechanisms such as those explained above suffer from a variety of deficiencies. One such deficiency is that a conventional test script, whether generated in Visual Basic, or by way of other programming languages, is difficult and time consuming to generate and also difficult to maintain as the web server and web server software application changes from time to time. The web server software application can change, for example, if a new web page format is introduced, or a new web page sequence flow through the web site is introduced.

Embodiments of the invention significantly overcome such deficiencies and provide mechanisms and techniques that provide a virtual web user system and method, wherein test scripts are used to test one or more web servers, and for which the test scripts are automatically generated. The present invention provides the user with the ability to rapidly generate a functional, load, or monitoring test script, with minimal coding effort.

In accordance with the present invention, a method for generating a test script associated with a virtual web user system used to test one or more web servers includes recording web user actions and selecting from among the web user actions to provide only those actions which communicate with the web server or have side effects which alter a future communication with a server. Using only those actions which communicate with the web server server or have side effects which alter a future communication with a server, a test script is automatically generated having a reduced size. The test script can be instantiated any number of times to simulate any number of web users in selected ones of a functional test, a load test, and a monitoring test. With this particular arrangement, the engineering time required to generate test scripts for testing a web server is minimized and the resulting test code is more accurate than code otherwise obtained.

In accordance with another aspect of the present invention, a computer program medium having computer readable code thereon for testing a web server includes instructions for generating a test script associated with a virtual web user used to test the web server, including instructions for recording web user actions and instructions for selecting from among the web user actions to provide only those actions which communicate with the web server or have side effects which alter a future communication with a server. Using only those actions which communicate with the web server or have side effects which alter a future communication with a server, the computer program medium includes instructions for automatically generating a test script having a reduced size. The computer program medium also includes instructions with which the test program can be instantiated any number of times to simulate any number of web users in selected ones of a functional test, a load test, and a monitoring test.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides computer language interpretation and optimization for server testing as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing computer language interpretation and optimization for server testing as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Empirix Inc. of Bedford, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Before describing the present invention, some introductory concepts and terminology are explained. As used herein, the term "virtual web users" is used to describe simulated web page users provided by a "virtual web user system" that generates simulated web signals used to test a web server or an associated software application. The term "test script," as used herein, refers to a portion of a test program used in a virtual web user system to test a web server, for example, a web server associated with the Internet.

As used herein, a web server can be a server coupled to the Internet or coupled to an Intranet. It should be appreciated that the present invention is not limited only to servers and associated software applications coupled to the Internet, nor is it limited only to Hyper Text Transport Protocol (HTTP) described below. It should be appreciated that the same methods and techniques described herein apply equally well to any form of network, any form of network server, any form of network communications, and any form of communications between software components on the same or different machines.

The term "effect," as used herein, refers to an effect of a user action upon a web page. For example, a user action corresponding to a click on a web page button causes an effect, which, for example, can be a communication to a web server to provide another web page. An "effect" however can also have associated effect data. For example, the effect can further include reception of the new web page from the server, wherein the new web page corresponds to effect data. Therefore, an "effect" will be understood to include an effect of a user action upon a web page, which, in some instances, also includes associated effect data. As described below, it should be appreciated that not all effects resulting from user actions are associated with a communication to a server. For example a change in submitted data (e.g., correcting the spelling of an incorrectly entered piece of text) may not be associated with a communication to a server.

The term "cause," as used herein refers to the user action, which provides an "effect" as described above. For example, the cause of the example above is the user mouse click. A "cause," however can also have associated cause data. For example, where the user has first entered a name in a text box on a web page and then clicked the button on the web page, the user name can become part of the above-described communication to the server, causing the server to respond in a particular way. Therefore, a cause will be understood to include a user action and, in some instances, also associated cause data.

Figure 1:
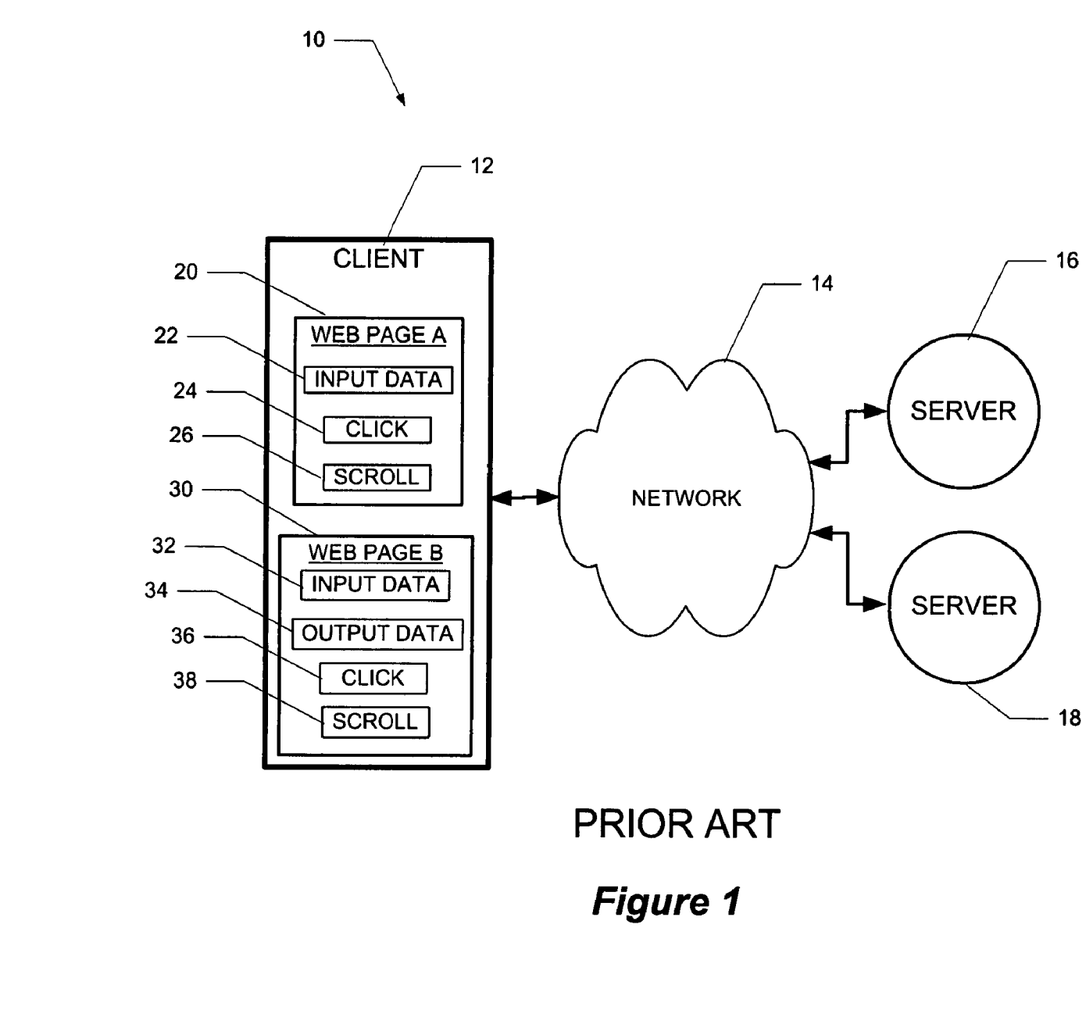
FIG. 1 is a block diagram of a prior art client and web server arrangement.

Referring now to FIG. 1, a prior art network system 10 includes at least one client 12, coupled though a network 14 to servers 16 and 18. In one arrangement, the network 14 can be the Internet. However, in other arrangements, the network 14 can be a local area network (LAN), or any other form of network.

In operation, the client 12, having a web browser software application running thereon, is provided, by a user, with a universal resource locator (URL) which is transported upon the network 14 in an HTTP request further described below, and which is directed to a server associated with the URL, for example server 16. In response, server 16 sends a web page to the client 12, resulting in a web page display 20 upon the client 12. The web page display 20 may include a variety of fields with which a user can interact. For example, the web page display 20 may include one or more input data fields 22 in which the user can enter data, for example a user name. The web page display 20 can also include one of more buttons 24 upon which a user can perform a mouse click in order to obtain an effect. The web page display 20 may also include one or more scroll regions 26, which perform a predetermined function, for example a data display, if the user scrolls a cursor upon one of the one or more scroll regions 26.

In operation, when a user clicks on the button 24, the web browser, which generates the web page display 20, can automatically generate an effect, which can include sending a new HTTP request to the network 14, and which is directed to a different server, such as server 18. In response, server 18 provides another effect as a new and different web page received by the client 12, providing another web page display 30. The client 12 can also receive additional effects, for example an effect displayed by the web page 30 in an output data box 34, having data from earlier user data entry in the data field 22 of web page display 20.

The web page display 30 can include one or more data fields 32 in which the user can enter data, for example a user address. The web page display 30 can also include one or more buttons 36 upon which a user can perform a mouse click in order to perform an action and generate an effect. The web page display 30 can also include one or more scroll regions 38. The web page 30 can also include one or more additional effects, for example as output data boxes 34, having data from earlier user data entry in the data field 22. Further, there may be non-visible effects such as hidden state that can be used in a future communication with a server and can be changed by a user action.

Alternatively, when a user clicks on the button 24, the web browser which generates the web page display 20, can automatically send the original HTTP request, having the original URL, to the network 14 but with a new path descriptor, which is again directed to server 16, whereupon server 16 sends the effects, including the web page 20, and the output data 34 to the client 12.

In some instances, only some of the actions taken by a user, for example a click in the button 24, provide effects that include communications from the client 12, via the network 14, to the one or more severs 16 and 18, or from the one or more servers 16 and 18, via the network 14, to the client 12. In contrast, others of the user actions, for example scrolling upon the scroll region 26, can provide effects having no communications though the network 14, instead drawing effect data from the code underlying the web page display 20, already received by the client 12.

An HTTP request is made up of three primary parts, a URL, a header, and post data. Though the HTTP request is described herein, it should be understood that the present invention applies equally well to other forms of requests including, but not limited to, JavaScript, Simple Object Access Protocol (SOAP), and file transport protocol (FTP). HTTP is a protocol most often associated with Internet communications.

The URL specifies a protocol, a port, a domain, a path, a query string, and an anchor. The port is generally 80, but can be specified by the user. A computer has many ports of which it can use to receive and/or transmit data. The domain is a target computer (server) to which data is to be sent. The path specifies a file requested from the specified domain's filesystem. The query string provides extra data to the server that it may use in constructing the response data that it sends. The anchor is for use by the browser software running in the client computer to tell it where on the page to center itself.

For example, in the URL:
http://www.empirix.com/info/
about_us.html?name=Fred#more info "http:" is the transport protocol, www.empirix.com is the domain, "/info/about_us.html" is the path, "name=Fred" is the query string and "more info" is the anchor.

A header of a URL is a list of name and value pairs where the names are known by the servers 16 and 18. The client 12 can send any number of these pairs to the server in a request. The server can use this data when formatting its response to the client 12. Two frequently dynamic headers are "cookie" and "referrer". A cookie header is generally used so that the servers 16 and 18 know which client 12 they are communicating with and can provide the client 12 with personalized information. The referrer header identifies to the server 16 and 18 the web page the client is currently viewing. If the client is currently coupled to web site "a" and the user clicks a link to a site "b," the request to site "b" will include a referrer header to site "a."

Post data is used to convey all other data to the server 16 and 18 that the server(s) needs. Post data is frequently passed in name and value pairs. The Post data communicates to the server 16 and 18 information about data the user enters into form fields (e.g., 22, 24, 26) on the client computer 12, files that the user wants to send to the server 16 and 18, and anything else the designer of a web site associated with the server 16 and 18 site wants to communicate. Post data can also be set as merely one raw block of data or in a series of multi-part blocks of data. Multipart post data is primarily used to upload files to the server.

It will be appreciated that a test for testing a web server does not need to have included cause-effect pairs that are not associated with communications to the web server. In some scenarios, associated data can be changed by user actions. For example, a test of a web page button cause needs only to communicate an effect to the web server, which can include a URL and sometimes associated data, and receive effects from the web server, which can include a web page and sometimes associated data. Other user actions, for example a scroll to a scroll region (e.g., scroll region 26) that is not associated with communication to the web server is not needed for a test of the web server. However, user entry of data into some data fields (e.g., data field 22) can be associated with a mouse click upon a button (e.g., button 24). The data thus entered by the user becomes part of a cause, which can be used in a test.

Several examples resulting in HTTP requests to a web site are given below. Each request is associated with a user action, a cause, and an effect.

Below is an example of a simple link click. A corresponding web page appearing on the client display would have a link that says "Click Me." Clicking the link would take the user to a web page, page 2. The present invention identifies a cause associated with the user's click action, where the cause is an href property of the "a" element identifying from where to get a URL of the next request. A corresponding effect would be an HTTP request to "page_2.html" having the proper URL, header, and post data.

```
<html>
<body>
<a href="page_2.html"> Click Me </a>
</body>
</html>
```

Below is an example of a site with a frame set. A corresponding web page appearing on the client display would appear split into two parts. The present invention generates data from reading this page, identifying a cause as associated with the two src properties. A corresponding effect would be two HTTP requests, one associated with each src property, and each having the proper URL, header, and post data.

```
<html>
<frameset cols="300,*">
  <frame name="left" src=" left_frame.html">
  <frame name="right" src=" right_frame.html">
</frameset>
</html>
```

Below is an example of a site with a client side redirect. The present invention parses the embedded javascript and identifies a cause having data associated with the javascript. A corresponding effect would be an HTTP request to "page_2.html" having the proper URL, header, and post data.

```
<html>
<script>
location.href = "page_2.html";
</script>
</html>
```

Below is an example of a site with a client side scripting that causes navigation based on a user click. A corresponding web page appearing on the client display would have a button that says "Click Me." Clicking the button would interpret the embedded JavaScript and take the user to a web page, page 2. The present invention identifies a cause associated with the user's click action, where the cause as an href property of the "location" element identifying from where to get a URL of the next request. A corresponding effect would be an HTTP request to "page_2.html" having the proper URL, header, and post data.

```
<html>
<script>
function nav( )
{
location.href = "page_2.html";
}
</script>
<button onclick="nav( );"> Click Me </button>
</html>
```

Below is an example of a site with a client side redirect caused by a meta tag. The page will wait one second and then redirect to page 2. The present invention identifies a cause from the "meta" element and "content" attribute having data indicating "page 2.html." A corresponding effect would be an HTTP request after 1 second to "page 2.html" having the proper URL, header, and post data.

```
<html>
<head>
<meta http-equiv="refresh" content="1, url='page_2.html'">
</head>
<body>
```

-continued

```
redirecting in 1 second ...
</body>
</html>
```

Below is an example of a site with a form. A corresponding web page appearing on the client display would have a form with data to fill in and a button identified as "Submit." The user clicks the Submit button and the form submits to the server 16a, 16b. The present invention identifies a cause to be the submit operation having data identifying where to get the URL and also the form data. The cause would understand that the cause data must come from user actions, i.e., entry of data into the form. A corresponding effect would be an HTTP request to "page_2.html" having the proper URL, header, and post data, including the form data

```
<html>
<body>
<form action="page_2.asp">
<input name="x" value="a">
<input name="y" value="b">
<button type=submit> Submit </button>
</form>
</body>
</html>
```

Below is an example of a complex link click. A corresponding web page appearing on the client display would have a link that says "Click Me." Clicking the link would take the user to a web page "page 3." Clicking the link would reditrect to page 3 and not page 2 because of the embedded javascript. The present invention interprets the javascript, and identifies a cause by determining that the complex link changes the href of the link and therefore the javascript is what controls where the browser goes next. A corresponding effect would be an HTTP request to "page_3.html" having the proper URL, header, and post data.

```
<html>
<head>
<script>
function change_me( )
{
        document.links[0].href = "page_3.html";
}
</script>
</head>
<body>
<a href="page_2.html" onclick="change_me( )"> Click Me </a>
</body>
</html>
```

Below is an example of using hidden fields to maintain state information. A corresponding web page appearing on the client display would have a button that says "Click Me." Clicking the button would take the user to a web page "page 2" with post data containing the client computer's current time when the button was clicked. JavaScript running when the button was clicked would create the client's time stamp. The JavaScript would insert that time stamp into the hidden field. The hidden field's value would be posted to the server when the form is submitted. The form would be submitted immediately after the hidden field was modified as a subsequent result of the button click. A corresponding effect would be an HTTP request to "page_2.html" having the proper URL, header, and post data (which includes the time stamp in the hidden field).

```
<html>
<head>
<script>
function setTimeStamp( )
{
        var d = new Date( );
        var elmt = document.getElementById("time");
        elmt.value = d.toString( );
}
</script>
</head>
<body>
<form action="page_2.html">
        <input type="hidden" name="time" value=""/>
        <button type="submit" onclick="setTimeStamp( );">
            Click Me
        </button>
</form>
</body>
</html>
```

Figure 2:
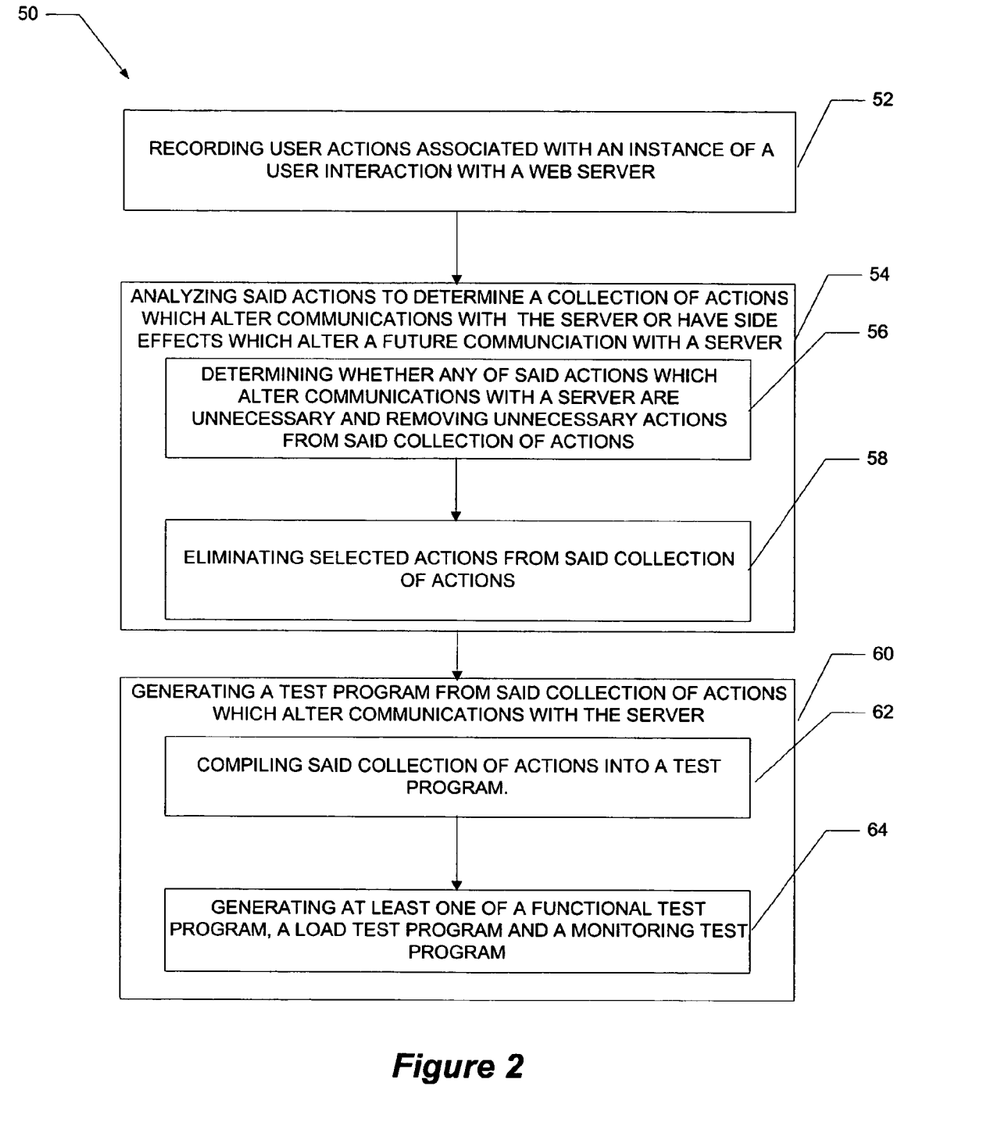
FIG. 2 is a flow diagram describing a first embodiment of a method of generating a test program in accordance with aspects of the present invention.
Figure 3:
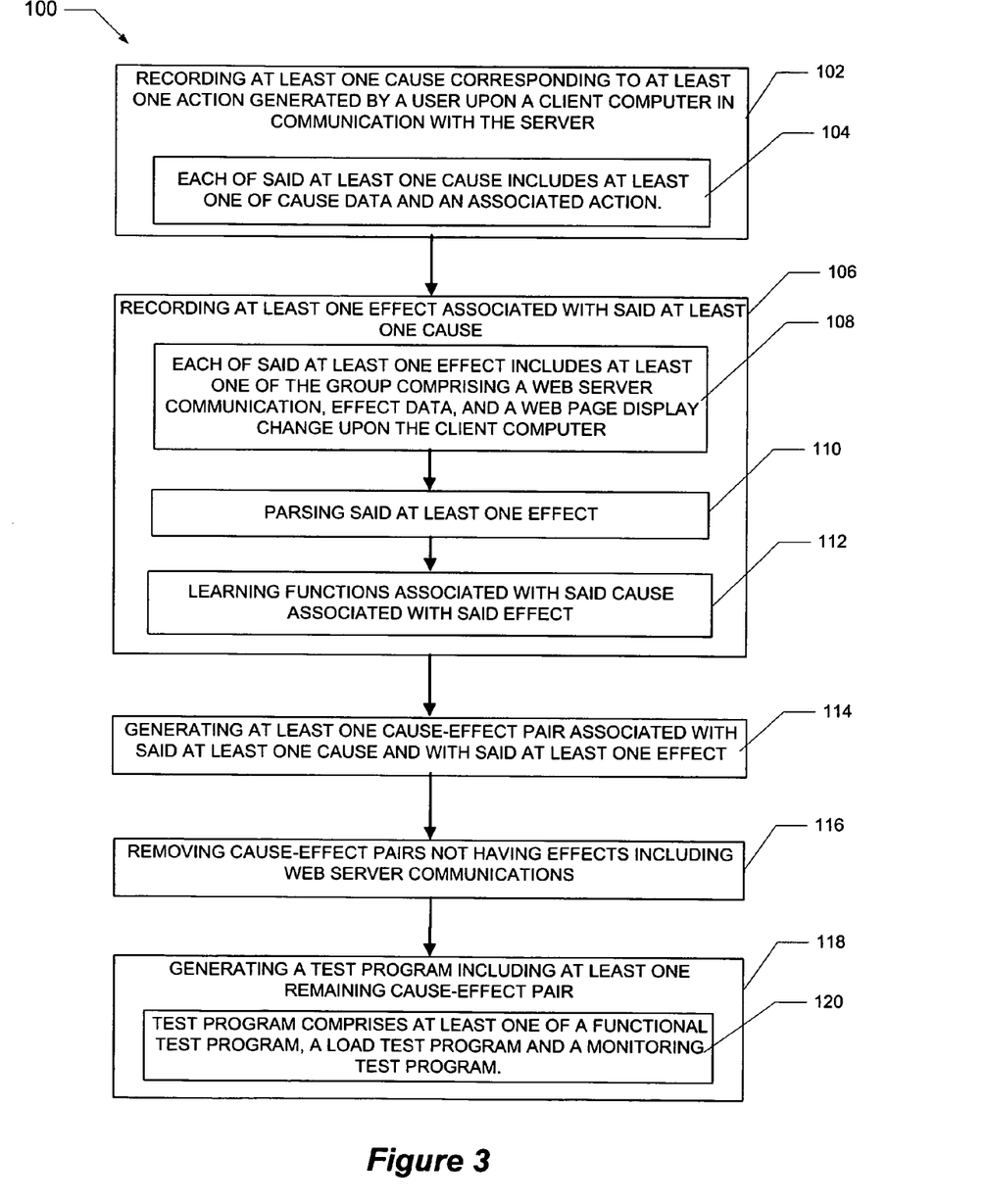
FIG. 3 is a flow chart describing another embodiment of a method of generating a test program in accordance with aspects of the present invention.
Figure 4:
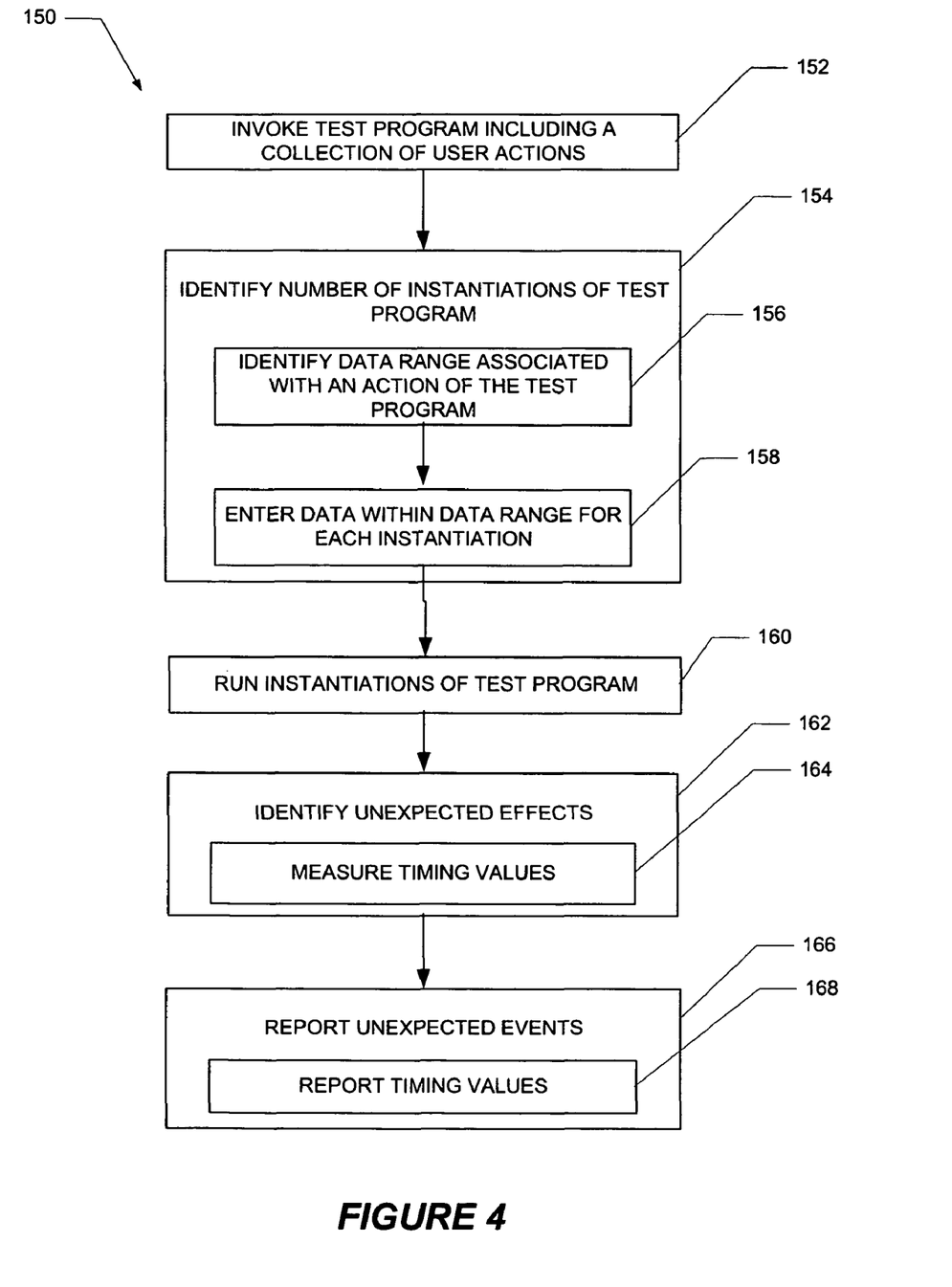
FIG. 4 is a flow chart describing a method of testing a web server using the test program as generated in accordance with aspects of the present invention.

A flow chart of the presently disclosed methods of generating a test program is depicted in FIGS. 2 and 3 and a flow chart of the presently disclosed method of testing a web server is depicted in FIG. 4. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a method 50 for generating a test program for testing a server begins at processing block 52 where user actions associated with an instance of a user interaction with a web server are recorded.

In processing block 54, the recorded actions are analyzed. This is done to determine a collection of actions which alter communications with the server or have side effects which alter a future communication with a server.

In processing block 56, a determination is made regarding whether any of the actions which alter communications with a server or have side effects which alter a future communication with the server are unnecessary. When any of the recorded actions are determined to be unnecessary, these unnecessary actions are removed from the collection of actions.

In processing block 58, additional actions may be eliminated from the collection of actions.

In processing block 60, a test program is generated from the collection of actions which alter communications with the server or have side effects which alter a future communication with a server.

In processing block 62, the test program may be generated by compiling the collection of actions. In processing block 64, the test program which is generated may be one of a functional test program, a load test program or a monitoring program.

Referring now to FIG. 3, a method 100 for generating a test program for testing a server begins at processing block 102. Here, at least one cause corresponding to at least one action generated by a user upon a client computer in communication with the server is recorded. A cause may be associated with a mouse click and may occur due to the action generated by the user such as, for example, a data entry or a mouse click As shown in processing block 104, each of the at least one cause which has been recorded may include associated cause data, and/or an associated action. The cause data may be, for example, a URL sent to the server over the network and the associated action may include the web page received from the server.

At processing block 106, at least one effect associated with the at least one cause is recorded. As disclosed in processing block 108 the effect may include a web server communication, effect data and a web page display change.

At processing block 110, the received effect is parsed. This may be done, for example, to find embedded scripts, HTML objects, and software objects. At processing block 112 functions are learned which correspond to the cause which is associated with the effect. The functions which are learned may include checkbox clicks which generate data that may be part of a cause, or user key-press actions which generate activity that may be considered data that is used in identifying a cause.

At processing block 114, the cause identified at processing block 102 is linked with the effects identified at processing block 106, forming cause-effect pairs.

At processing block 116, the effects recorded at processing block 106 and the matching causes recorded at processing block 102, linked at processing block 114 into cause-effect pairs, are analyzed and reduced. In a particular embodiment, only those linked cause-effects pairs that are associated with communications between the client and the server are retained. As described above in conjunction with FIG. 1, not all user actions performed in association with a web page result in communications via a network to a server. The cause-effect pairs that are not associated with communications to the server are discarded. As a result, a reduced group of cause-effect pairs is generated, having only the remaining cause-effect pair(s), which are associated with a communication to and/or from the server.

At processing block 118 a test program is generated including the cause-effect pairs determined in processing block 116. As stated in processing block 120, the test program can be used to perform functional testing, load testing and monitoring testing or any combination thereof.

Referring now to FIG. 4, a method 150 of testing a web server begins at processing block 152, where the test program is invoked. The test program includes the cause-effect pairs, for example the test program identified at processing block 118 of FIG. 3, and is adapted to communicate those effects with the web server under test. In an alternate arrangement, the test application provides a user interface by which a user can choose selected ones of the cause-effect pairs.

At processing block 154, the user selects a number of instantiations of the test program, representing a number of virtual web users to be interacting with the web server under test either simultaneously or in series. It should be appreciated that the user can select different numbers of virtual web users depending upon whether the test is to be a functional test, a load test, or a monitoring test.

At processing block 156, each cause-effect pair is examined to identify data ranges that may be associated with either the cause or the effect as described above.

At processing block 158, the user can enter selected ranges for each type of data, wherein tests will automatically be generated covering the selected ranges. In one particular embodiment, data is randomly selected from within the data ranges, having a new random value at each successive test. In another particular embodiment, data is selected to progressively change from one end of the data range to the other end of the data range, having a new value at each successive test. The different data can be applied either across different virtual web users selected at processing block 154 or across different tests by the same virtual web user.

As an example of the above data, a cause may have been identified to include a birth date entered by a user into a web page data field. At processing block 156 an acceptable range of birth dates, which can be further selected by the user at processing block 156 is set to a particular range. Then, at processing block 158, data can be presented randomly or progressively into the instantiations of the associated cause-effect pair for communication with the web server under test.

At processing block 160, the instantiations of the test program are run either in parallel or in series as specified by the user at processing block 154. In essence, each cause-effect pair is run, providing associated communications to and/or from the web server under test.

At processing block 162, unexpected results are identified. For example, a web server might respond to an HTTP request with a web page other than the expected web page associated by a particular cause-effect pair.

At processing block 164, a variety of timing values are measured to identify conforming and/or non-conforming behavior of the web server under test. For example, the timing value measured may be a response time associated with an effect, e.g., the test application can measure how long it takes a web server to respond once it has been addressed with a URL.

At processing block 166, the unexpected results identified at processing block 162 can be reported to the user is a variety of ways, including, but not limited to, a graphical user display and a printed report.

At processing block 168, the timing values measured at processing block 164 can be reported to the user is a variety of ways, including, but not limited to, a graphical user display and a printed timing report.

Figure 5:
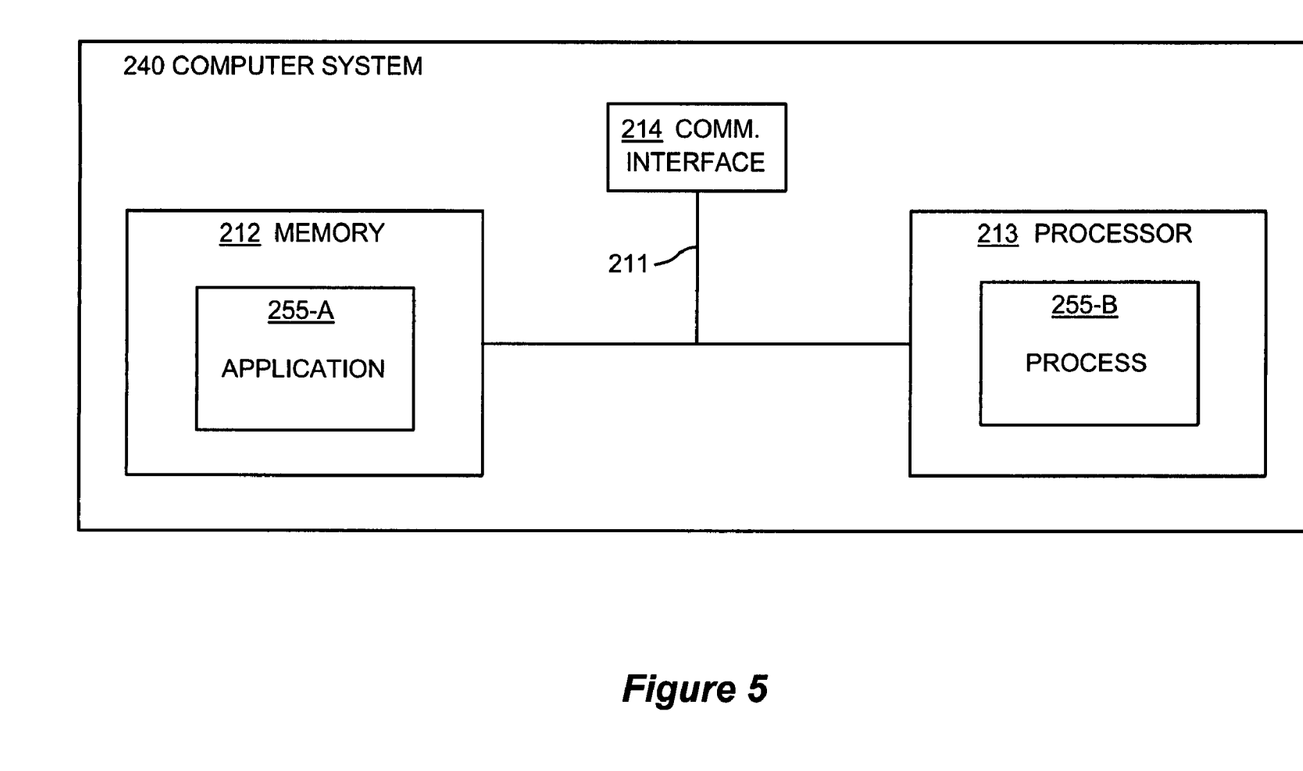
FIG. 5 illustrates an example computer system architecture for a computer system that performs computer language interpretation and optimization for server testing in accordance with embodiments of the invention.

Referring now to FIG. 5, an example architecture of a computer system 240 used for computer language interpretation and optimization for server testing is shown. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system. It is to be understood that the system operates as explained in former examples are represented in FIG. 5 by the application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method for generating a test program for testing a server, comprising:
   recording at least one cause corresponding to at least one action generated by a user upon a client computer in communication with the server;
   recording at least one effect associated with said at least one cause and parsing said at least one effect, and wherein said parsing said at least one effect further comprises learning functions which associate said cause with said effect;
   generating at least one cause-effect pair based at least in part on the learning functions; said cause-effect pair providing a similar communication to be sent to said server as said cause without having to simulate the action generated by the user, said cause-effect pair further causing a receipt of a similar communication from said server as said effect without having to simulate the action generated by the user;
   determining and removing cause-effect pairs not having effects including web server communications; and
   generating a test program including at least one remaining cause-effect pair.

2. The method of claim 1 wherein each of said at least one cause includes at least one of cause data and an associated action.

3. The method of claim 1 wherein each of said at least one effect includes at least one of the group comprising a web server communication, effect data, and a web page display change upon the client computer.

4. The method of claim 1 wherein generating a test program comprises generating at least one of a functional test program, a load test program and a monitoring test program.

5. A computer readable medium having computer readable code thereon for generating a test program for testing a server, the medium including instructions in which a computer system performs operations comprising:

instructions for recording at least one cause corresponding to at least one action generated by a user upon a client computer in communication with the server;

instructions for recording at least one effect associated with said at least one cause, and parsing said at least one effect, and wherein said parsing said at least one effect further comprises learning functions which associate said cause with said effect;

instructions for generating at least one cause-effect pair based at least in part on the learned functions, said cause-effect pair providing a similar communication to be sent to said server as said cause without having to simulate the action generated by the user, said cause-effect pair further causing a receipt of a similar communication from said server as said effect without having to simulate the action generated by the user;

instructions for determining and removing cause-effect pairs not having effects on web server communications; and instructions for generating a test program including at least one remaining cause-effect pair having effects on web server communications.

6. The computer readable medium of claim 5 wherein said instructions for recording each of said at least one cause includes instructions for recording at least one of cause data and an associated action.

7. The computer readable medium of claim 5 wherein said instructions for recording each of said at least one effect includes instructions for recording at least one of the group comprising a web server communication, effect data, and a web page display change upon the client computer.

8. The computer readable medium of claim 5 wherein said instructions for generating a test program comprises instructions for generating at least one of a functional test program, a load test program and a monitoring test program.

9. A computer system comprising:

a memory;

a processor;

a communications interface;

an interconnection mechanism coupling the memory, the processor and the communications interface; and wherein the memory is encoded with an application that when performed on the processor, provides a process for processing information, the process causing the computer system to perform the operations of:

recording at least one cause corresponding to at least one action generated by a user upon a client computer in communication with the server;

recording at least one effect associated with said at least one cause, and parsing said at least one effect, and wherein said parsing said at least one effect further comprises learning functions which associate said cause with said effect;

generating at least one cause-effect pair based at least in part on the learned functions, said cause-effect pair providing a similar communication to be sent to the said server as said cause without having to simulate the action generated by the user, said cause-effect pair further causing a receipt of a similar communication from said server as said effect without having to simulate the action generated by the user;

determining and removing cause-effect pairs not having effects on web server communications; and generating a test program including at least one remaining cause-effect pair having effects on web server communications.

10. The computer system of claim 9 wherein each of said at least one cause includes at least one of cause data and an associated action.

11. The computer system of claim 9 wherein each of said at least one effect includes at least one of the group comprising a web server communication, effect data, and a web page display change upon the client computer.

12. The computer system of claim 9 wherein generating a test program comprises generating at least one of a functional test program, a load test program and a monitoring test program.

13. The method of claim 1 wherein said parsing comprises finding at least one of the group consisting of embedded scripts, HTML objects, and software objects.

14. The method of claim 1 wherein said functions which are learned include one of the group consisting of checkbox clicks which generate data that are part of a cause, and user key-press actions which generate activity that are considered data that is used in identifying a cause.

15. The computer readable storage medium of claim 5 wherein said parsing comprises finding at least one of the group consisting of embedded scripts, HTML objects, and software objects.

16. The computer readable storage medium of claim 5 wherein said functions which are learned include one of the group consisting of checkbox clicks which generate data that are part of a cause, and user key-press actions which generate activity that are considered data that is used in identifying a cause.

17. The computer system of claim 9 wherein said parsing comprises finding at least one of the group consisting of embedded scripts, HTML objects, and software objects.

18. The computer system of claim 9 wherein said functions which are learned include one of the group consisting of checkbox clicks which generate data that are part of a cause, and user key-press actions which generate activity that are considered data that is used in identifying a cause.

* * * * *

UNITED STATES PATENT AND TRADEMARK OFFICE
CERTIFICATE OF CORRECTION

| | | |
|---|---|---|
| PATENT NO. | : 7,877,736 B2 | Page 1 of 1 |
| APPLICATION NO. | : 10/968246 | |
| DATED | : January 25, 2011 | |
| INVENTOR(S) | : Houh et al. | |

It is certified that error appears in the above-identified patent and that said Letters Patent is hereby corrected as shown below:

On sheet 2 of 5, in Figure 2, Box No. 54, line 3, delete "COMMUNCIATION" and insert -- COMMUNICATION --, therefor.

In column 1, line 54, delete "properly," and insert -- properly. --, therefor.

In column 2, line 32, delete "server server" and insert -- server --, therefor.

In column 7, line 57, delete ""page 2.html."" and insert -- "page_2.html." --, therefor.

In column 7, line 58, delete ""page 2.html"" and insert -- "page_2.html" --, therefor.

In column 8, line 18, delete "data" and insert -- data. --, therefor.

In column 8, line 33, delete "reditrect" and insert -- redirect --, therefor.

In column 10, line 16, delete "click" and insert -- click. --, therefor.

Signed and Sealed this
Twentieth Day of September, 2011

David J. Kappos
*Director of the United States Patent and Trademark Office*